Patented Mar. 23, 1937

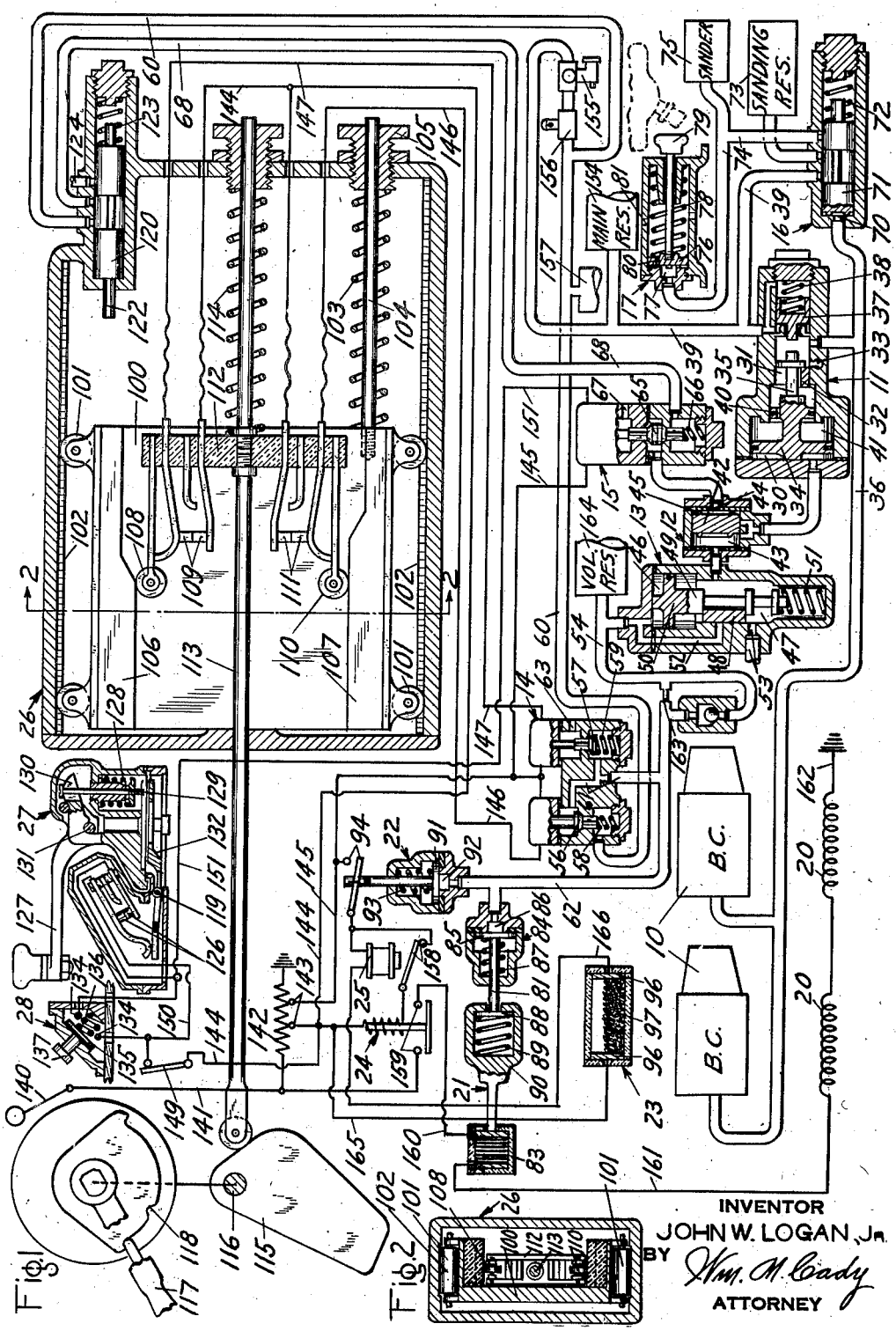

2,074,752

UNITED STATES PATENT OFFICE 2,074,752

BRAKE CONTROL EQUIPMENT

John W. Logan, Jr., Forest Hills, Pa., assignor to The Westinghouse Air Brake Company, Wilmerding, Pa., a corporation of Pennsylvania Application February 7, 1936, Serial No. 62,750

34 Claims. (Cl. 303—24)

This invention relates to brake control equipments, and more particularly to brake control equipments for traction and railway vehicles.

When stopping a traction or railway vehicle from relatively high speeds it is desirable that the vehicle be decelerated at a selected uniform rate of retardation, in order to minimize the danger of wheel sliding and to avoid discomfort to the passengers. It has heretofore been proposed to accomplish this by controlling brake applications through manipulation of a selective type retardation controller device, sometimes referred to as a "brake valve type" retardation controller device. In this type of device an application of the brakes is initiated by moving a control element to various application positions corresponding to selective rates of retardation, and the retardation controller device thereafter functions to maintain the selected rate of retardation.

Where friction type brakes only are employed, as for example the familiar fluid pressure operated type of friction brake universally used, the degree of braking which is produced for a given brake cylinder pressure is greater at the lower speeds than at the higher speeds, due to the fact that the coefficient of friction between the brake shoes and wheel treads increases as the speed of the vehicle diminishes. The retardation controller device must therefore cycle more or less continuously when making a stop with this type of brake if there is to be maintained a uniform rate of retardation.

Where an electrodynamic type of brake, as for example the eddy current type brake, is employed, the rate of retardation may be maintained more uniform without continuous cycling of the retardation controller device, because the braking characteristic of this type brake does not increase with decreasing speed, but remains substantially uniform throughout the greater portion of the deceleration period, decreasing, however, first slowly and then rapidly, at the end of the deceleration period, and finally producing no braking effect at zero speed. Although the braking characteristic of an eddy current type brake is substantially uniform throughout a wide range of speed, the rate of retardation produced thereby will not be constant for all load conditions of the vehicle, nor if the variations in current supply are large.

In the present invention, I contemplate the provision of a brake equipment suitable for high speed vehicle use in which an electrodynamic brake of the eddy current type is employed for making normal stops, with a fluid pressure brake supplied as a "stand by" brake to supplement the electrodynamic brake, and to be applied at the end of the deceleration period when the effectiveness of the electrodynamic brake diminishes due to decrease in speed.

The modern tendency is to design traction vehicles of very light material, so that the mass to be accelerated and decelerated will be a minimum, and thereby permit higher rates of acceleration and deceleration. In such cases the passenger load may bear a high ratio to the dead weight of the vehicle, and the degree of braking required of the electrodynamic brakes to produce a given rate of retardation will vary over wide limits with changes in load. In some instances the braking required may exceed the capacity of the electrodynamic brakes, in which case the fluid pressure brakes must be applied also to produce the required high rate of retardation. In the present invention I propose to arrange the control apparatus so that when the electrodynamic brake has been applied to full capacity the fluid pressure brake is then applied to produce the additional braking necessary to retard the vehicle at the selected rate of retardation.

It is therefore a general object of the present invention to provide an improved brake equipment for traction and railway vehicles in which an electrodynamic brake is employed for making normal or service stops, with a fluid pressure brake conditioned as a "stand by" brake operative to supplement the electrodynamic brake when necessary, and to be in all cases applied at the end of the deceleration period to insure stopping of the vehicle and holding it at rest.

A further object of the invention is to provide a brake equipment of the type above referred to, in which the control is governed by the manual manipulation of a selective type retardation controller device, the degree of braking being determined by the manual selection of a desired rate of retardation.

Where vehicles are to be operated at relatively high speeds safety consideration require that provision be made for initiating an emergency application of the brakes upon incapacitance of the operator, failure of power supply, and other similar incidents. It is therefore a further object of the present invention to provide in addition to the features already enumerated the feature commonly referred to as "deadman control", and an arrangement whereby a loss of power supply automatically effects an emergency application of the brakes.

It is a yet further object of the invention to provide a brake equipment in which an eddy current brake is employed to make service stops, with a supplemental fluid pressure brake fully or partially suppressed during normal stops, but with provision for applying the fluid pressure brake to a maximum degree when initiating emergency applications, a retardation controller device of the selective type being provided to control both service and emergency applications.

Since when the vehicle is brought to a stop the eddy current brakes are ineffective it is desirable that the eddy current brakes be disconnected from the source of power supply in order to prevent undue loss of power. It is therefore a further object of the invention to provide a brake equipment of the type hereinbefore referred to in which means responsive to the speed of the vehicle operates at or near the end of the deceleration period to disconnect the eddy current brake devices from the source of power supply.

More specific objects, dealing with constructions, arrangement of parts, and inter-related functions of the eddy current and fluid pressure brakes will appear more fully from the following description, which is taken in connection with the attached drawing, wherein;

Fig. 1 illustrates in schematic and diagrammatic form an embodiment of the invention adapted to a single vehicle.

Fig. 2 illustrates in diagrammatic form a sectional view of the retardation controller device, taken along line 2—2 of Fig. 1.

Referring now to the drawing, the fluid pressure brake system may comprise brake cylinders 10, relay valve device 11, double check valve device 12, a biased relay valve device 13, an emergency magnet valve device 15, application and release magnet valve device 14, sanding and motor cut-out valve device 16, and circuit breaker opener device 17.

The eddy current brake system may comprise eddy current brake devices represented by the windings 20, a fluid pressure operated rheostat device 21, a fluid pressure operated switch device 22, a motion detector device 23, and electric relays 24 and 25.

The control for the two brake systems may comprise a retardation controller device 26 of the selective, or "brake valve", type, a safety control switch portion of a motorman's controller 27 and a safety control foot switch 28.

Considering in detail first the parts of the fluid pressure brake system, while only two brake cylinders 10 have been illustrated, it will be apparent that any number may be employed and in any suitable manner.

The relay valve device 11 is embodied in a casing having a piston chamber 30 and a slide valve chamber 31. Disposed in the slide valve chamber 31 is a slide valve 32 which controls communication between the slide valve chamber and an exhaust port 33. Disposed in the piston chamber 30 is a piston 34 having a stem 35 adapted to actuate the slide valve 32 with a delayed or lost motion movement.

The slide valve chamber 31 is in open communication with the brake cylinders 10 by way of pipe 36. A supply valve 37, urged toward a seated position by a spring 38, controls communication from a main reservoir pipe 39 to the slide valve chamber 31.

When fluid under pressure is supplied to the piston chamber 30 the piston 34 is actuated to the right, the slide valve 32 then being shifted to a position to blank the exhaust port 33, and following this to a position where stem 35 engages the supply valve 37 to unseat it. Fluid under pressure then flows from the main reservoir pipe 39 to slide valve chamber 31 and from thence through pipe 36 to brake cylinders 10. Fluid in chamber 31 also flows through restricted port 40 to chamber 41, and when the pressure in chamber 41 equals or slightly overbalances that in chamber 30 spring 38 shifts piston 34 to lap position, in which position valve 37 is seated while slide valve 32 continues to blank exhaust port 33.

When fluid under pressure is released from the piston chamber 30 piston 34 moves to the position shown in the drawing, in which case slide valve 32 uncovers the exhaust port 33 and fluid under pressure in the brake cylinders 10 is released to the atmosphere.

The double check valve device 12 is embodied in a casing having a sliding type valve 42 subject on its left side to pressure in a chamber 43 and on its right side to pressure in a chamber 44. The valve 42 is provided with a seat rib 45 which when seated on the gasket to the right by a relatively low pressure in chamber 43 will be so maintained seated against a relatively high pressure in chamber 44. For example, if the pressure in chamber 43 is 15 pounds or greater, than the pressure in chamber 44 required to shift valve 42 to its left hand position must be 40 pounds greater than that in chamber 43. The purpose of this will appear more fully later.

The biased relay valve device 13 is embodied in a casing having a piston chamber 46 and a slide valve chamber 47. Disposed in the chamber 47 is a slide valve 48 which is actuated by a stem 49 of piston 50. A spring 51 acts upon the lower end of stem 49 to bias piston 50 to the upper position shown. The initial tension on spring 51 is such that a predetermined pressure, as for example 35 pounds, must be produced in piston chamber 46 in order to actuate piston 50 to the position where slide valve 48 uncovers passage 52 and blanks pipe and passage 53.

Passage 52 and piston chamber 46 are in communication with a pipe 54 to which fluid under pressure is supplied when effecting an application of the brakes, and when slide valve 42 uncovers the passage 52 fluid may flow to the chamber 47 and from thence to chamber 43 in the double check device 12. When the piston 50 is in the position illustrated in the drawing, chamber 47 is in communication with the atmosphere by way of the pipe and passage 53.

The application and release magnet valve device 14 comprises an application valve 56 and a release valve 57. A spring 58 urges the application valve 56 toward unseated position while an electromagnet (not shown) operates when energized to actuate the application valve to seated position. A spring 59 urges the release valve 57 toward seated position, while another electromagnet (not shown) operates when energized to unseat the release valve 57.

When the release valve 57 is seated and supply valve 56 is unseated, fluid under pressure may flow from a feed valve pipe 60, past the unseated supply valve 56, and through pipe and passage 61 to an application pipe 62. When the application valve 56 is seated this flow is cut off, and when the release valve 57 is unseated fluid under pressure is released from the application pipe 62 to the atmosphere by way of exhaust port 63.

The emergency magnet valve device 15 is embodied in a casing having a double beat valve 65 urged toward upper seated position by a spring 66 and toward lower seated position by an electromagnet (not shown) in the upper part of the valve device casing, which when energized actuates the double beat valve 65 downwardly. When the double beat valve 65 is in lower seated position a communication is established between the chamber 44 in the double check valve device 12 and the atmosphere by way of exhaust port 67. When the double beat valve 65 is in upper seated position this exhaust communication is cut off and a communication is established between a pipe 68 and the double check valve chamber 44.

The sanding and motor cut-off valve device 16 is embodied in a casing having a chamber 70 and a piston type valve 71 disposed therein. A spring 72 biases the valve 71 to a left hand position, in which position the main reservoir pipe 39 is connected to a sanding reservoir 73. The initial tension on spring 72 is such that a predetermined pressure, as for example 30 pounds, is required to be established in the chamber 70 in order to shift the valve 71 to the position where sanding reservoir 73 is disconnected from the main reservoir pipe 39 and reconnected to a pipe 74 leading to a sanding device 75 and to the circuit breaker opener device 17.

The circuit breaker opener device 17 is embodied in a casing having a piston 76 subject on its left hand side to pressure of fluid supplied to a chamber 77 and on its right hand side to pressure exerted by a spring 78. When fluid under pressure is supplied to the chamber 77 to a predetermined degree, the piston 76 is actuated to the right and a knob 79 engages the handle (shown in broken lines) of a circuit breaker to shift the handle to a position where the circuit breaker opens the power supply to the driving motors. Fluid under pressure supplied to chamber 77 escapes slowly to the atmosphere by way of restricted port 80 and opening 81, and after a predetermined length of time spring 77 returns piston 76 to the position illustrated.

Considering now the parts of the eddy current brake system, while only two eddy current brake devices 20 have been indicated it will be apparent that any number of these may be provided, as for example one associated with each axle of the vehicle, or in any other suitable manner.

The fluid pressure operated rheostat device 21 comprises a rheostat device 83 of the carbon pile type, which is adapted to have the resistance therein varied by a fluid pressure operated device 84. This device comprises a piston 85 subject on its right hand side to pressure of fluid supplied to a chamber 86 and on its left hand side to pressure of a calibrated spring 87. The spring 87 is calibrated so that when the pressure in chamber 86 reaches 4 pounds the piston 85 begins to move to the left and reaches the end of its travel when the pressure in chamber 86 reaches 35 pounds.

The piston 85 has associated therewith a stem 81 connected to an abutment 88 in contact with a spring 89 in a spring cage 90. The spring cage 90 bears directly upon the carbon piles in the rheostat device 83, and the parts are so designed that the resistance established by the resistance device 83 corresponds to the degree of pressure in the chamber 86 between the range of 4 and 35 pounds.

It will be understood, of course, that the pressures used in describing the functioning of the various parts in this embodiment are merely illustrative, and employed only to facilitate the understanding of this particular embodiment.

The fluid pressure operated switch device 22 is embodied in a casing having a piston 91 subject on its lower side to pressure of fluid supplied of chamber 92 and on its upper side to pressure of spring 93. When fluid under pressure is supplied to the chamber 92 above 4 pounds, the piston 91 will move upwardly to close contacts 94.

The motion detector device 23 is preferably connected to a vibrating part of the vehicle and embodied in an insulating casing having two electric conducting members 96 between which are disposed a quantity of carbon granules 97, or similar electric conducting particles, so arranged that when the detector device is vibrating due to the vehicle traveling above a predetermined speed the electrical resistance between the two members 96 is such that the current flowing between the two members is limited to a low degree and when the vibration diminishes as the vehicle speed drops below this predetermined speed, the electrical resistance diminishes such that the current flowing between the two members 96 increases to a relatively high degree.

The motion detector relay 25 operates in connection with the motion detector device 23, while the relay 24 controls the power supply circuit to the eddy current brake devices 20, as will more fully hereinafter appear.

The retardation controller device 26 is embodied in a casing having an inertia operated body 100 provided with wheels or rollers 101 rolling in a trackway 102. A spring 103, concentrically disposed on a rod 104, biases the body 100 to an extreme left hand position. The rod 104 is secured at one end to the body 100 and is slidably disposed in a bushing 105, at its other end, secured to the retardation control device casing. The body 100 carries two cams 106 and 107, both preferably made of some insulating material. The cam 106 is adapted to actuate a roller 108 associated with release contacts 109, while the cam 107 is adapted to actuate a roller 110 associated with application contacts 111.

The release and application contacts are carried by an insulating member 112 secured to a rod 113, which is biased to an extreme left hand position by a spring 114.

The rod 113 is slidable in the retardation control device casing and is positionable against opposition of spring 114 by rotation of an actuating cam 115 secured to a shaft 116. The shaft 116 is rotatable by manipulation of a brake controller handle 117, which may be actuated from a release position (which is that shown in Fig. 1) to a lap position, which is that indicated by the notch 118, and to a plurality of application positions beyond the lap notch 118.

When the handle 117 is actuated from its release position to the lap position, roller 108 will roll off the high part of cam 106 and permit release contacts 109 to be opened. When the handle 117 is actuated beyond the lap position into the application zone, roller 110 will roll off the high part of cam 107 and permit contacts 111 to be opened. It is to be understood that the release and application contacts open due to the resiliency of their supporting elements.

The retardation controller device is positioned on the vehicle so that after the release and application contacts have been actuated to the right, and the brakes thus applied as will be more fully described hereinafter, the force of inertia acting upon the body 100 will actuate it to the right, whereupon roller 110 will roll onto the high part of cam 107, to close the application contacts, and subsequently, if the body 100 moves far enough, roller 108 will roll onto the high part of cam 106 to close the release contacts 109.

It will be obvious that the release and application contacts may be positioned different distances to the right, and that the movement of the inertia operated body 100 against tension of spring 103 will actuate the contacts to closed positions at different rates of retardation, depending upon the movement of the contacts to the right.

Disposed in the retardation control device casing is a valve 120 having a stem 122. The valve 120 is normally biased to a left hand position by spring 123, so that communication is established between the aforementioned supply pipe 68 and feed valve pipe 60. When the inertia operated body 100 is actuated to the right under a force of inertia corresponding to a maximum rate of retardation, the valve 120 is shifted to a position where pipe 68 is disconnected from pipe 60 and connected to an exhaust pipe 124. It is to be understood that the rate of retardation which thus causes body 100 to actuate the valve 120 corresponds to that which will result in actuating the application and release contacts when in their extreme position to the right.

The safety control switch portion of the motor controller device 27 comprises essentially a set of contacts 126, which are adapted to be closed when the motor controller handle 127 is held in a depressed position, as illustrated, and to be opened when the motor controller handle 27 is permitted to be actuated to an upper position by a spring 128. The spring 128 acts upon a pin 129 secured to or associated with an arm 130 forming a part of the handle 127. The handle 127 is pivoted at 131 and the downward force exerted by spring 128 tends to rotate the handle 127 in a clockwise direction about this pivot. When the handle is thus rotated pin 129 engages the right end of a lever 132 to rotate it in a clockwise direction about a fulcrum 119 to effect disengagement of the contacts 126. It will thus be seen that when pressure manually applied to hold the handle 127 depressed is released spring 128 will effect opening of contacts 126.

The safety control foot switch device 28 is embodied in a casing having stationary contacts 134 and a movable bridging contact 135, adapted to be actuated out of engagement with the stationary contacts by a spring 136. A foot button 137 is adapted when depressed by the foot of an operator to cause engagement of the bridging contact 135 with the stationary contacts 134.

The operation of this embodiment of my invention is as follows:

*Running condition*

When the vehicle is running under power, or coasting, the brake controller handle 117 is maintained in its release position, while the operator maintains pressure manually applied to either the foot button 137 or to the motor controller handle 127, or to both. With these conditions obtaining the parts of the brake equipment will be in the positions as illustrated.

The current supply for maintaining the parts in the illustrated positions is taken from a trolley 140. Connected to the trolley 140 by a conductor 141 is a resistance device 142. This device is provided with terminals 143 from which current is supplied to operate the electroresponsive devices already described. Connected to one terminal 143 is one main supply conductor 144 and connected to the other terminal 143 is a second main supply conductor 145.

With the brake controller handle 117 in release position, the application electromagnet in the application and release magnet valve device 14 will be energized through a circuit which, beginning at the main supply conductor 144, includes application contacts 111 of the retardation controller device 26, application conductor 146, the application electromagnet, and supply conductor 145.

The release electromagnet will be energized through a circuit which, beginning at the main supply conductor 144, includes release contacts 109 of the retardation controller device, release conductor 147, the release electromagnet, and the supply conductor 145.

Assuming now that pressure is manually applied to the motor controller handle 127 and not applied to the foot button 137, as illustrated, the emergency magnet valve device 15 will be energized through a circuit which, beginning at the supply conductor 144, includes conductor's switch 149, conductor 150, contacts 126, conductor 151, the emergency magnet valve 15, and the other supply conductor 145. It will be apparent from the arrangement illustrated that the magnet valve device 15 will be energized if the contacts of the foot switch device 28 are closed instead of the contacts of the motor controller device. On the other hand, it should be apparent that the emergency magnet valve device will be deenergized if both sets of contacts are opened simultaneously, or if conductor's switch 149 is opened.

With the parts in the positions illustrated, the sanding reservoir 73 will be charged from the main reservoir pipe 39 through the sanding and motor cut out valve device 16. The main reservoir pipe 39 is connected to a main reservoir 154. This main reservoir is charged with fluid under pressure from the usual compressor (not shown), and is connected to a feed valve device 155 of the usual type. For the purposes of illustration it will be assumed that the pressure in the main reservoir is maintained between 70 and 90 pounds, and that the feed valve device 155 is set to limit the pressure of supply from the main reservoir to the feed valve pipe 60 to 55 pounds.

In order that the pressure in the feed valve pipe 60 shall not rise above some predetermined value, as for example 58 pounds, a safety valve device 156, set at 58 pounds, is interposed between the feed valve pipe and the feed valve device. And in order to add capacity to the feed valve pipe 60, so that fluctuations in pressure shall be a minimum, a capacity reservoir 157 is connected to the feed valve pipe.

*Service application*

When it is desired to effect a service application of the brakes, the brake controller handle 117 is moved into the application zone to a degree according to the desired rate of retardation. At the same time, pressure is maintained manually applied to the motor controller handle 127 or to the foot switch button 137, or to both.

As brake controller handle 117 is actuated to application position, the application and release contacts 109 and 111 are moved to the right. As roller 108 rolls off the cam 106 the release contacts 109 are opened to effect deenergization of the release electromagnet in the magnet valve device 14. This permits spring 59 to seat the release valve 57, and thus close the communication between the application pipe 62 and the atmosphere. As the roller 110 rolls off cam 107, application contacts 111 open to deenergize the application electromagnet, and thus permit valve 56 to be unseated by spring 58.

Fluid under pressure then flows from the feed valve pipe 60 past the unseated supply valve 56 and through pipe and passage 61 to the application pipe 62. From the application pipe 62 fluid under pressure flows to chamber 86 in the fluid pressure operated device 84 and to chamber 92 in the fluid pressure operated switch device 22. Piston 91 is then actuated upwardly to close contacts 94 when the pressure in chamber 92 reaches approximately 4 pounds.

Closing of contacts 94 establishes a circuit to the relay 24, which circuit includes, beginning from the main supply conductor 144, relay 24, contacts 158 of the motion detector relay 25, which are now closed, contacts 94, and the other main supply conductor 145. Relay 24 will then close its contacts 159, to establish a circuit from the trolley 140 to the eddy current brake devices 20, which circuit includes, trolley conductor 141, contacts 159 of relay 24, conductor 160, the carbon pile rheostat device 83 and conductor 161, the return connection being by way of ground wire 162. The eddy current brake devices will thus be energized and will produce a braking effect.

As the pressure of fluid supplied to chamber 86 in the fluid pressure operated device 84 increases above 4 pounds, the pressure on the carbon pile rheostat 83 will increase and thus decrease the resistance. The degree of eddy current braking will correspondingly increase.

Fluid under pressure will also flow from the application pipe 62 through choke 163 to the pipe 54, and from thence to the chamber 46 in the biased relay valve device 13. As before explained, the piston 50 will not be actuated downwardly until the pressure in chamber 46 has reached a value of 35 pounds.

It is intended that for pressures in application pipe 62 up to 35 pounds, the eddy current brakes will be effective enough under most conditions to produce the highest rate of retardation required for service applications. Therefore, for pressure in application pipe 62 below 35 pounds the biased relay valve device 13 will not respond, so that the fluid pressure brakes will not ordinarily be applied.

With the eddy current brakes applied and the vehicle decelerating, the inertia operated body 100 will move to the right. When the body has moved far enough for roller 110 to roll onto the high part of cam 107, the application contacts 111 will be closed to again energize the application electromagnet and seat the application valve 56. The supply of fluid under pressure to the application pipe 62 will then be lapped.

If the body 100 should continue to move to the right roller 108 will roll onto the high part of cam 106 and thus close the release contacts 109, to again energize the release electro-magnet and unseat the release valve 57. This will release fluid under pressure from the pipe 62 until the rate of retardation diminishes enough for body 100 to move back to the left. It will be observed that the arrangement of the cams 106 and 107 is such that a lap of the supply to the pipe 62 obtains when roller 110 is on the high part of cam 107 and roller 108 is on the low part of cam 106. This is the position that these parts will assume when the eddy current brakes only are applied and the rate of retardation produced thereby corresponds to the position of the brake controller handle 117.

Assuming now that the trolley voltage should diminish, or that the vehicle load is relatively great, such that the braking produced by the eddy current brakes would be insufficient to maintain the selected rate of retardation, then the body 100 will move to the left to open both the release contacts 109 and the application contacts 111. Fluid under pressure will be then supplied to the pipe 62 to a higher degree.

Assuming that the pressure of fluid thus supplied is above 35 pounds, piston 50 in the biased relay valve device 13 will be actuated downwardly to establish communication between the passage 52 and chamber 47. From chamber 47 fluid under pressure will then flow to chamber 43 in double check valve device 12, where the valve 42 will be actuated to its right hand position, and will then flow to chamber 39 in relay valve device 11. In this valve device, piston 34 will be shifted to its right hand position to close exhaust port 33 and unseat supply valve 37. Fluid under pressure will then flow from the main reservoir pipe 39 to the brake cylinder pipe 36. The fluid pressure brakes will thus be applied.

When the combined pressure of fluid supplied to chamber 47 in the biased relay valve device 13 and that of spring 51 slightly overbalances the pressure of fluid in chamber 46, piston 50 will move to a lap position, where slide valve 48 blanks both passage 52 and pipe and passage 53. This will cause the parts of the relay valve device 11 to also move to lap position to cut off further supply to the brake cylinders 10. It will thus be apparent therefore that the fluid pressure brakes are applied to a degree proportional to the increase of pressure in pipe 62 above 35 pounds.

Now when the combined braking due to application of both the eddy current and fluid pressure brakes produces the desired rate of retardation, the body 100 of the retardation controller device will move to the position where contacts 111 are closed and contacts 109 remain opened. The supply to the application pipe 62 will then be lapped again.

It will thus be seen that if for any reason the degree of braking produced by the eddy current brakes should be insufficient to produce the desired rate of retardation, then the fluid pressure brakes will be cut in to make up the deficiency.

Assuming now that a decreasing trolley voltage was the sole cause for applying the fluid pressure brakes and that the voltage now returns to normal, it will be apparent that the retardation controller device will function to diminish the pressure in the application pipe 62 to some value below 35 pounds, in which event piston 50 of the biased relay valve device 13 will move to its uppermost position, and thus release fluid under pressure from chamber 30 of the relay valve device 11 to the atmosphere, by way of pipe and passage 53. The relay valve device 11 will then function to release fluid under pressure from the brake cylinder 10 to the atmosphere, by way of exhaust port 33.

Now as the speed of the vehicle diminishes with the eddy current brakes only applied, the braking will again diminish due to the inherent characteristics of the eddy current brake. The retardation controller device will again function to increase the pressure in the application pipe 62, and thus again reapply the fluid pressure brakes. It is particularly desirable that the fluid pressure brakes be applied gradually as the effectiveness of the eddy current brake diminishes.

In order to accomplish this, the aforementioned choke 163 is interposed between the application pipe 62 and the biased relay valve device 13, and in addition a volume reservoir 164 is connected to the pipe 54, so as to delay the rise of pressure in the relay valve piston chamber 46. The size of choke 163 and the capacity of volume reservoir 164 are such that the rise of pressure in the piston chamber 46 corresponds substantially to the rate of decrease of effectiveness of the eddy current brakes. Thus the fluid pressure brakes are applied at the end of the stop, when the eddy current brakes decrease in effectiveness, at a relatively slow rate so that a smooth stop is effected.

It will also be observed that since the maximum pressure which may be established in the application pipe 62 is 55 pounds, the biased relay valve device 13 can by its operation only effect a maximum brake cylinder pressure of 20 pounds.

When the fluid pressure operated switch device 22 closed its contacts 94, it also connected the motion detector relay 25 in series with the motion detector device 23, between the two main supply conductors 144 and 145. This circuit includes, beginning at the supply conductor 144, conductor 165, motion detector device 23, conductor 166, motion detector relay 25, and contacts 94.

When the speed of the vehicle diminishes to some low speed, as for example 5 miles per hour, the vibration of the motion detector device 23 will decrease sharply and the resistance between the members 96 will diminish rapidly. Relay 25 will then be energized sufficiently to open contacts 158, thereby deenergizing relay 24. This relay will then open its contacts 159 to deenergize the eddy current brake devices. The deenergization of the eddy current brake devices will occur after the fluid pressure brakes have been applied, so that the vehicle will be brought to a stop promptly.

When the vehicle has been brought to a stop the operator moves the brake controller handle 117 to the lap position, corresponding to the notch 118. In this position, as before described, release contacts 109 will be opened and application contacts 111 will be closed. The fluid pressure brakes will then be held applied with a pressure in the brake cylinders corresponding to the maximum which may be effected by operation of the biased relay valve device 13, i. e., 20 pounds.

It will be apparent, of course, that after a brake application has been initiated that the operator may increase or decrease the degree of application by merely moving the brake controller handle 117 to different positions in the application zone. Thus if the track rails are dry a higher rate of retardation may be selected by moving the brake controller handle to extreme positions in the application zone, and if the rails are wet or icy the brake controller handle is moved a lesser distance into the application zone.

*Emergency application*

An emergency application of the brakes may be effected by simultaneously releasing pressure on the handle 127 and the foot button 137, or by opening conductor's switch 149, or will automatically result upon a failure of the power supply, such as the trolley 140 leaving the trolley wire or for other similar reasons.

If pressure applied to the handle 127 and foot button 137 is released, or switch 149 opened, the circuit to the emergency magnet valve device 15 will be interrupted and this magnet valve device thus deenergized. The double beat valve 65 will be then actuated to upper seated position to connect pipe 68 to chamber 44 in the double check valve device 12. Since pipe 68 is at this time in communication with the feed valve pipe 60, fluid under pressure will flow from the feed valve pipe through the pipe 68 and past the double beat valve 65 to chamber 44 in the double check valve device. Valve 42 will then be shifted to its left hand position and fluid will flow to the relay valve piston chamber 30. The relay valve device 11 will then function to connect the main reservoir pipe 39 to the brake cylinders 10. Since now the supply of fluid under pressure to the relay piston chamber 30 may rise to feed valve pressure, it follows that the ultimate brake cylinder pressure may also correspond to feed valve pressure.

With the fluid pressure brakes thus applied and the vehicle decelerating, the inertia operated body 100 in the retardation controller device will move to the right. When the body has moved to a potion such that it engages stem 122 of valve 120, it first shifts the valve to a position where communication between pipes 60 and 68 is cut off, with the result that the fluid pressure brake application will be lapped. If the body 100 moves further to the right to connect pipe 68 to exhaust pipe 124, the degree of application of the fluid pressure brakes will be diminished until the body 100 moves back to the position where valve 120 laps the communication to pipe 68.

Now due to the fact that the braking produced by the fluid pressure operated friction brakes will increase as the speed diminishes, it will be obvious that the body 100 will move back and forth to intermittently release fluid under pressure from the brake cylinders, and if necessary resupply fluid under pressure thereto, in order to maintain a substantially constant rate of retardation.

When the vehicle comes to a rest the body 100 will assume the position shown in the drawing, whereupon pipe 68 will again be connected to pipe 60. A release of the brakes may, however, be effected by again energizing the emergency magnet valve device 15, and fluid under pressure supplied to the relay piston chamber 30 will then be released to the atmosphere through the exhaust port 67 in the magnet valve device.

If there should be a failure of power supply, then not only will the emergency magnet valve device 15 be deenergized, but the electromagnets in the application and release magnet valve device 14 will also be deenergized. Fluid under pressure will therefore be supplied to the application pipe 62 simultaneously with the supply to the pipe 68. Fluid supplied to the application pipe 62 will, of course, not effect an application of the eddy current brakes if there is a failure of electric power supply.

Fluid under pressure in pipe 62 will flow to piston chamber 46 in the biased relay valve device 13. This flow will however be slow due to the presence of the choke 163 and volume reservoir 164. In addition, since the biased relay valve device does not respond to pressures lower than 35 pounds, it will be obvious that the supply to the chamber 44 in the double check valve device 12, due to deenergization of the emergency magnet valve device 15, will take place rapidly and shift the valve 42 to its left hand position. The communication from the biased relay valve device 13 to the relay valve device 11 will therefore be cut off and the communication from the emergency magnet valve device to the relay valve device 11 opened. The fluid pressure brakes will therefore be applied to a maximum degree.

It should be noted, however, that if the power supply should fail at a time when during a service application the biased relay valve device 13 has effected a brake cylinder pressure of 15 pounds, or greater, that deenergization of the emergency magnet valve device will not result in the maximum brake cylinder pressure, as valve 42 in the double check valve 12 will have been shifted to its right hand position and there will be insufficient differential of pressure in chamber 44 to shift it to its left hand position.

It will of course be obvious that the retardation controller device 26 will function as before to limit the rate of retardation produced.

In the meanwhile, the biased relay valve device 13 will at 35 pounds pressure in chamber 46 operate to open communication between the passage 52 and chamber 43 of the double check valve device 12. It will be obvious therefore that two sources of supply will be available for effecting an application of the fluid pressure brakes, and that the supply of higher pressure predominates (except in the case noted), so that the brakes will be applied to whatever degree is sufficient to maintain the maximum rate of retardation.

When the relay valve device 11 effects a brake cylinder pressure of 30 pounds, or greater, the sanding and motor cut out valve device will respond to connect the sanding device 75 and cut out device 17 to the sanding reservoir 73. The sanding device will of course sand the rails to increase the adhesion, so as to minimize the danger of wheel sliding, while the cut out device opens the power circuit breaker to prevent supply of current to the motors upon return of the power supply.

While I have described my invention with particular reference to one embodiment thereof, it is not my intention to be limited to the exact details of this embodiment or otherwise than by the spirit and scope of the appended claims.

Having now described my invention, what I claim as new, and desire to secure by Letters Patent, is:

1. In a vehicle brake system, in combination, fluid pressure brake means, electric brake means, a pipe to which fluid under pressure is supplied in effecting an application of the brakes, means responsive to the pressure of fluid in said pipe for effecting and controlling the degree of operation of said electric brake means, and means for preventing application of said fluid pressure brake means until said electric brake means has been applied to a maximum degree at a chosen fluid pressure in said pipe and for then effecting application of said fluid pressure brake means to a degree proportional to the further increase of fluid pressure in said pipe above said chosen pressure.

2. In a vehicle brake system, in combination, fluid pressure brake means, electric brake means, a pipe, means responsive to a low value of pressure in said pipe for effecting operation of said electric brake means and for increasing the degree of operation as the pressure in said pipe increases, and means also responsive to pressures in said pipe and operable only at pressures above that corresponding to the maximum degree of operation of said electric brake means for effecting operation of said fluid pressure brake means to a degree proportional to the increase of pressure in said pipe above that corresponding to said maximum degree.

3. In a vehicle brake system, in combination, a brake cylinder, an eddy current brake device, a pipe, means for supplying fluid under pressure to said pipe, means responsive to a low pressure in said pipe for effecting energization of said eddy current brake device and for increasing the degree of energization thereof as the pressure in said pipe increases to a chosen value, and means operative at pressures only above said chosen value for effecting a supply of fluid under pressure to said brake cylinder the degree of which corresponds to the degree of pressure in said pipe above said chosen value.

4. In a vehicle brake system, in combination, an electric brake device, a brake cylinder, a pipe, means for supplying fluid under pressure to said pipe, means responsive to the pressures in said pipe for effecting energization of said electric brake device and for increasing the energization thereof as the pressure in said pipe increases, and a valve device responsive only to pressures in said pipe above that corresponding to maximum energization of said electric brake device for supplying fluid under pressure to said brake cylinder.

5. In a vehicle brake system, in combination, fluid pressure brake means, electric brake means, a pipe, means for supplying fluid under pressure to said pipe, means for effecting and controlling operation of said electric brake means according to the pressure of fluid in said pipe and operable to effect a maximum degree of operation of said electric brake means when the pressure in said pipe increases to a chosen value, means responsive to pressures in said pipe only above said chosen value for effecting operation of said fluid pressure brake means to a degree which corresponds to the increase of pressure above said chosen value, and means for controlling the pressure of fluid supplied to said pipe according to the rate of retardation of the vehicle.

6. In a vehicle brake system, in combination, a brake cylinder, an eddy current brake device, a pipe, means responsive to pressures established in said pipe for effecting an application of said eddy current brake device, means responsive only to pressures in said pipe above that corresponding to a maximum degree of application of said eddy current brake device for effecting a supply of fluid under pressure to said brake cylinder, a control element, and retardation controlling means for varying the pressure in said pipe to produce a rate of retardation corresponding to the degree of movement of said control element.

7. In a vehicle brake system, in combination, a brake cylinder, an electric brake device, a pipe, switch means responsive to a low pressure established in said pipe for connecting said electric brake device to a source of current supply, pressure operated means responsive to an increase of pressure in said pipe for varying the degree of current supplied to said electric brake device, a valve device responsive only to pressures in said pipe above that corresponding to maximum energization of said electric brake device for opening a communication through which fluid under pressure is supplied to effect a supply of fluid under pressure to said brake cylinder, and retardation controlling means for controlling the supply of fluid under pressure to said pipe.

8. In a vehicle brake system, in combination, electric brake means operative to produce a braking effect which diminishes at low vehicle speeds, fluid pressure brake means, a pipe, means for effecting an application of said electric brake means to a degree corresponding to the degree of pressure in said pipe, said electric brake means being applied to a maximum degree when the pressure in said pipe reaches a chosen value, means responsive to the rate of retardation of the vehicle for increasing the pressure in said pipe as the effectiveness of said electric brake means diminishes, and means operable when the pressure in said pipe exceeds said chosen value for effecting an application of said fluid pressure brake means.

9. In a vehicle brake system, in combination, electric brake means operative to produce a braking effect which diminishes at low vehicle speeds, fluid pressure brake means, a pipe, means for effecting an application of said electric brake means to a degree corresponding to the degree of pressure in said pipe, said electric brake means being applied to a maximum degree when the pressure in said pipe reaches a chosen value, means responsive to the rate of retardation of the vehicle for increasing the pressure in said pipe as the effectiveness of said electric brake means diminishes, means operable when the pressure in said pipe exceeds said chosen value for effecting an application of said fluid pressure brake means, and means for controlling the rate of application of said fluid pressure brake means.

10. In a vehicle brake system, in combination, a pipe, an electric brake device, a brake cylinder, means operative to supply current to said electric brake device to a maximum degree when pressure is established in said pipe at or above a chosen value, a valve device connected to said pipe and operative when the pressure in said pipe exceeds said chosen value for effecting a supply of fluid under pressure to said brake cylinder, and means interposed between said valve device and said pipe for delaying the response of said valve device to the increase of pressure in said pipe.

11. In a vehicle brake system, in combination, electric brake means, fluid pressure brake means, means for establishing variable fluid pressures, means responsive to said fluid pressures for effecting an application of said electric brake means according to the degree of said pressures, means for increasing the degree of said fluid pressures when the effectiveness of said electric brake means diminishes, means responsive to said fluid pressures only above a degree corresponding to the maximum degree of application of said electric brake means for effecting an application of said fluid pressure brake means, and means operable at a low predetermined speed of the vehicle for cutting said electric brake means out of action.

12. In a vehicle brake system, in combination, fluid pressure brake means, electric brake means, a pipe, means for controlling applications of said electric brake means for pressures established in said pipe up to a chosen value, the effectiveness of said electric brake means diminishing at low vehicle speeds, means responsive to pressures established in said pipe above said chosen value for effecting an application of said fluid pressure brake means, a retardation controller device having a manually controlled element and an inertia controlled element, and means responsive to movement of said manually controlled element for effecting a supply of fluid under pressure to said pipe, and responsive subsequently to movement of said inertia controlled member for varying the pressure in said pipe, said inertia controlled member causing the pressure in said pipe to increase as the effectiveness of said electric brake means diminishes, whereby the pressure in said pipe may increase above said chosen degree.

13. In a vehicle brake system, in combination, an electric brake device, a brake cylinder, a retardation controller device having a manually controlled element and an inertia controlled element, means responsive to movement of said manually controlled element for establishing fluid pressures, means responsive to movement of said inertia controlled element for varying said fluid pressures, means responsive to said fluid pressures for effecting a supply of current to said electric brake device and operable to supply current to a maximum degree at a chosen fluid pressure, said inertia controlled element causing said fluid pressures to increase in degree as the effectiveness of said electric brake device diminishes, and means responsive to fluid pressures above said chosen degree for effecting a supply of fluid under pressure to said brake cylinder.

14. In a vehicle brake system, in combination, a brake cylinder, an electric brake device, a pipe to which fluid under pressure is supplied in effecting an application of the brakes, means responsive to pressures in said pipe for effecting an application of said electric brake device to a maximum degree when the pressure in said pipe reaches a chosen value, a valve device connected to said pipe and operative at pressures above said chosen degree for effecting a supply of fluid under pressure to said brake cylinder, means interposed between said valve device and said pipe for delaying the response of said valve device to increase of pressure in said pipe, and means operative upon decrease of pressure in said pipe below said chosen value for causing said valve device to respond quickly.

15. In a vehicle brake system, in combination, an eddy current brake device, a brake cylinder, a retardation controller device having a plurality of normally closed contacts adapted to be manually moved to a position where said contacts are opened, and having an inertia operated member moved according to the rate of retardation of the vehicle for subsequently closing said contacts, means responsive to opening of all of said contacts for effecting application of said brake means and responsive to closing of all but one of said contacts for effecting a lap of said application, a control element having a release, a lap, and a plurality of application positions, means responsive to movement of said element from said release position to said lap position for opening one only of said contacts and responsive to movement into any of said application positions for opening all of said contacts.

16. In a vehicle brake system, in combination, brake means, a first normally energized electroresponsive means operable when deenergized to effect an application operation of said brake means to a low degree, a second normally energized electroresponsive means operable when deenergized to effect an application operation of said brake means to a high degree, and means operative when said two electroresponsive means are simultaneously energized for causing said second electroresponsive means only to be effective in initiating an application operation of said brake means.

17. In a vehicle brake system, in combination, a brake cylinder, a pipe, means for supplying fluid under pressure to said pipe, a valve device responsive to pressures in said pipe above a chosen degree for effecting a supply of fluid under pressure to said brake cylinder to a relatively low degree, means operable simultaneously with supply of fluid under pressure to said pipe for effecting a supply of fluid under pressure to said brake cylinder to a relatively high degree, and means for delaying the response of said valve device whereby said last mentioned means is effective in supplying fluid under pressure to said brake cylinder.

18. In a vehicle brake system, in combination, electric brake means, fluid pressure brake means, a pipe, means for supplying fluid under pressure to said pipe, means responsive to pressures in said pipe up to a chosen degree for controlling the degree of application of said electric brake means, valve means responsive to pressures in said pipe above said chosen degree for effecting an application of said fluid pressure brake means to a degree corresponding to the increase of pressure in said pipe above said chosen degree, emergency means operative simultaneously with supply of fluid under pressure to said pipe to effect an application of said fluid pressure brake means to a degree higher than effected by operation of said valve means, and means effective when said emergency means is operated simultaneously with supply of fluid under pressure to said pipe for rendering said valve means ineffective to control application of said fluid pressure brake means.

19. In a vehicle brake system, in combination, a brake cylinder, a pipe, electroresponsive valve means operable to supply fluid under pressure to said pipe, service electroresponsive valve means operable in response to pressure in said pipe above a chosen value for opening a communication through which fluid under pressure is supplied to effect a supply of fluid at a moderate pressure to said brake cylinder, emergency electroresponsive valve means operable to open a communication through which fluid under pressure is supplied to a high degree to effect a supply of fluid at a high pressure to said brake cylinder, and means operable when said two electroresponsive valve means are simultaneously operated for closing said first mentioned communication.

20. In a vehicle brake system, in combination, brake means, a first electroresponsive valve means for controlling operation of said brake means, a second electroresponsive valve means for also controlling operation of said brake means, a set of contacts for controlling said first electroresponsive means, a valve for controlling the degree of operation of said brake means when controlled by said second electroresponsive means, and means governed by the rate of retardation of the vehicle for controlling said contacts and said valve.

21. In a vehicle brake system, in combination, brake means, a valve device operable to open a communication through which fluid under pressure is supplied to effect operation of said brake means to a relatively low degree, electroresponsive valve means operable to open a communication through which fluid under pressure is supplied to effect operation of said brake means to a relatively high degree, a set of contacts, means controlled by said contacts for controlling operation of said valve device, a valve controlling the communication opened by said electroresponsive valve means, and means governed by the rate of retardation of the vehicle for controlling said contacts and said valve.

22. In a vehicle brake system, in combination, electric brake means, fluid pressure brake means, a pipe, means responsive to pressures in said pipe for effecting an application of said electric brake means, the degree of application of said electric brake means being a maximum when the pressure in said pipe rises to a predetermined degree, valve means responsive to pressures in said pipe above said predetermined degree for effecting an application of said fluid pressure brake means to a relatively low degree, electroresponsive valve means operable to open a communication through which fluid under pressure is supplied to effect an application of said fluid pressure brake means to a maximum degree, a set of contacts for controlling the supply of fluid under pressure to said pipe, a valve for controlling the communication established by said electroresponsive valve means, and means operated according to the rate of retardation of the vehicle for controlling said contacts and said valve.

23. In a vehicle brake system, in combination, brake means, means for effecting a service operation of said brake means, a set of contacts for controlling said service operation, means for effecting an emergency operation of said brake means, a valve for controlling said emergency operation, and means governed by the rate of retardation of the vehicle for controlling operation of said contacts and operation of said valve.

24. In a vehicle brake system, in combination, fluid pressure brake means, electric brake means, means operable when effecting a service application of the brakes for effecting first a full application of said electric brake means and then a limited application of said fluid pressure brake means, means operable when effecting an emergency application of the brakes for effecting a full application of said fluid pressure brake means only, contacts for controlling said service application, a valve for controlling said emergency application, and means governed by the rate of retardation of the vehicle for controlling said contacts and said valve.

25. In a vehicle brake system, in combination, electric brake means, fluid pressure brake means, a retardation controller device having a set of manually positionable contacts movable from a biased position to various application positions, and having an inertia operated body adapted to operate said contacts at a rate of retardation corresponding to the manual positioning of said contacts, said retardation controller device also having a valve operable at a rate of retardation corresponding to the positioning of said contacts in a maximum application position, means responsive to manual positioning of said contacts for effecting a service application of said brake means, safety control means, means responsive to an operation of said safety control means for effecting an emergency application of said brake means, and means whereby said contacts and said inertia operated body coact to control said service application and said valve and said inertia operated body coact to control said emergency application.

26. In a vehicle brake system, in combination, electric brake means, fluid pressure brake means, means operable when effecting a service application of the brakes for effecting first a full application of said electric brake means and then a partial application of said fluid pressure brake means, means operable when effecting an emergency application of said brake means for effecting a full application of said fluid pressure brake means only, means for sanding the track rails, and means operable only when said fluid pressure brake means is applied to a degree higher than in said partial application for effecting operation of said sanding means.

27. In a vehicle brake system, in combination, fluid pressure brake means, electric brake means, a pipe to which fluid under pressure is supplied in effecting an application of the brakes, means responsive to the pressure of fluid in said pipe for effecting the operation of said electric brake means to produce a braking effect, and for increasing the degree of braking effect produced by said electric brake means as the pressure in said pipe increases, the degree of braking effect produced by said electric brake means reaching a maximum when the pressure in said pipe attains a chosen value, and means for delaying the operation of said fluid pressure brake means until the pressure in said pipe attains said chosen value, and for then effecting the operation of said fluid pressure brake means to produce a braking effect which corresponds to the increase of pressure in said pipe above said chosen value, the degree of braking effect produced by said fluid pressure brake means being at any time substantially proportional to said increase of pressure.

28. In a vehicle brake system, in combination, a brake cylinder, an eddy current brake device, a pipe, means responsive to pressures in said pipe between two chosen values for controlling the degree of application of said eddy current brake device, said degree of application increasing as the pressure in said pipe increases from the lower to the upper of said two chosen values, means responsive to pressures in said pipe above the upper of said chosen values for initiating a supply of fluid under pressure to said brake cylinder and for establishing the pressure of said supply in direct proportion to the increase in pressure in said pipe above said upper chosen value, and retardation controlling means for controlling the pressure of fluid in said pipe and being operable to vary said pressure above or below said upper chosen value.

29. In a vehicle brake system, in combination, fluid pressure brake means, electric brake means, a pipe, means responsive to pressures established in said pipe between a low value and a chosen value for controlling the degree of application of said electric brake means, said degree of application of said electric brake means increasing proportionately as the pressure in said pipe increases from said low to said chosen value, means responsive to pressures established in said pipe above said chosen value only for initiating an application of said fluid pressure brake means and for establishing the degree of application thereof directly in accordance with the degree of increase of pressure above said chosen value, means for supplying fluid under pressure to said pipe to any degree above or below said chosen value, and means responsive to the rate of retardation of the vehicle for varying the pressure of fluid established in said pipe in accordance with a selected rate of retardation.

30. In a vehicle brake system, electric brake means effective to produce a braking effect variable upon variations in the speed of the vehicle and upon variations in the degree of excitation thereof, friction brake means, means operative automatically according to the braking effect produced on the vehicle for varying the excitation of the electric brake means upon variations in speed of the vehicle to cause the electric brake means to produce a substantially uniform degree of braking effect on the vehicle, and means operative when the excitation of the electric brake means attains a maximum value to cause application of the friction brake means.

31. In a vehicle brake system, electric brake means effective to produce a braking effect variable upon variations in the speed of the vehicle and upon variations in the degree of excitation thereof, friction brake means, means operative automatically according to the braking effect produced on the vehicle for varying the excitation of the electric brake means upon variations in speed of the vehicle to cause the electric brake means to produce a substantially uniform degree of braking effect on the vehicle, and means operative when the excitation of the electric brake means attains a maximum value to cause application of the friction brake means, said means which is operative automatically according to the braking effect produced on the vehicle being operative to so control the friction brake means as to cause the braking effect produced by both the electric brake means and the friction brake means to remain substantially at the said uniform degree.

32. In a vehicle brake system, electric brake means, friction brake means, fluid pressure operated rheostat means operative upon an increase in the pressure of fluid supplied thereto to increase the excitation of the electric brake means, means effective to prevent operation of the rheostat means to further increase the excitation of the electric brake means when the pressure of fluid supplied to the rheostat means exceeds a predetermined pressure, and fluid pressure operated means subject to the pressure of fluid supplied to operate the rheostat means and operative when the pressure of the fluid exceeds the said predetermined pressure to effect application of the friction brake means.

33. In a vehicle brake system, an electric brake device, a rheostat operative to vary the excitation of said electric brake device, fluid pressure responsive means for operating said rheostat, fluid pressure operated means for operating a friction brake device, a fluid pressure operated valve device controlling the supply of fluid under pressure to said fluid pressure operated means, valve means for causing fluid under pressure to be simultaneously supplied to and released from said fluid pressure responsive means and said fluid pressure operated valve device, means for rendering said fluid pressure responsive means ineffective to further operate the rheostat to vary the excitation of the electric brake device when the pressure of the fluid supplied to the fluid pressure responsive means exceeds a predetermined pressure, said fluid pressure operated valve means being adapted to operate to cause fluid under pressure to be supplied to the fluid pressure operated means to operate the friction brake device only after the pressure of the fluid supplied to the fluid pressure operated valve means exceeds the said predetermined pressure.

34. In a vehicle brake system, an electric brake device, a rheostat operative to vary the excitation of said electric brake device, fluid pressure responsive means for operating said rheostat, fluid pressure operated means for operating a friction brake device, a fluid pressure operated valve device controlling the supply of fluid under pressure to said fluid pressure operated means, valve means for causing fluid under pressure to be simultaneously supplied to and released from said fluid pressure responsive means and said fluid pressure operated valve device, means for rendering said fluid pressure responsive means ineffective to further operate the rheostat to vary the excitation of the electric brake device when the pressure of the fluid supplied to the fluid pressure responsive means exceeds a predetermined pressure, said fluid pressure operated valve means being adapted to operate to cause fluid under pressure to be supplied to the fluid pressure operated means to operate the friction brake device only after the pressure of the fluid supplied to the fluid pressure operated valve means exceeds the said predetermined pressure, and being effective to regulate the pressure of the fluid supplied to the fluid pressure operated means to a pressure which is a uniform amount less than that acting on the fluid pressure responsive means.

JOHN W. LOGAN, Jr.